Nov. 16, 1971  DUNCAN TONG  3,619,938

SUBMERGED MODELS

Filed Dec. 4, 1970  6 Sheets-Sheet 1

Inventor
Duncan Tong
By
Dowell Dowell
Attorneys

Nov. 16, 1971     DUNCAN TONG     3,619,938
SUBMERGED MODELS
Filed Dec. 4, 1970    6 Sheets-Sheet 2
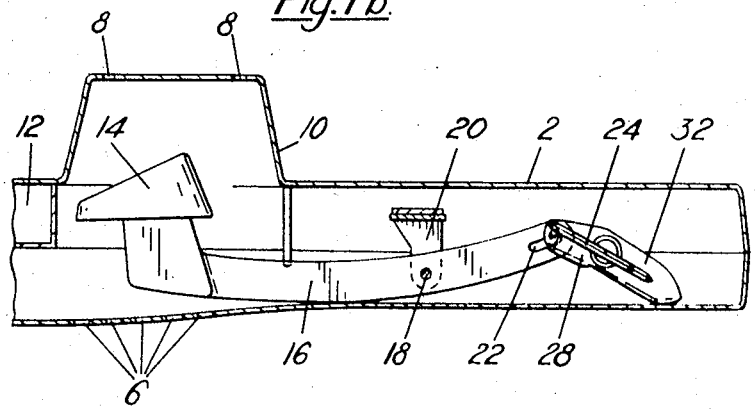
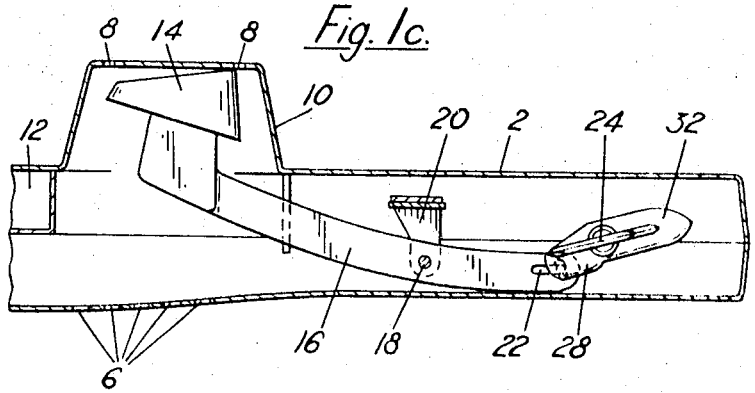
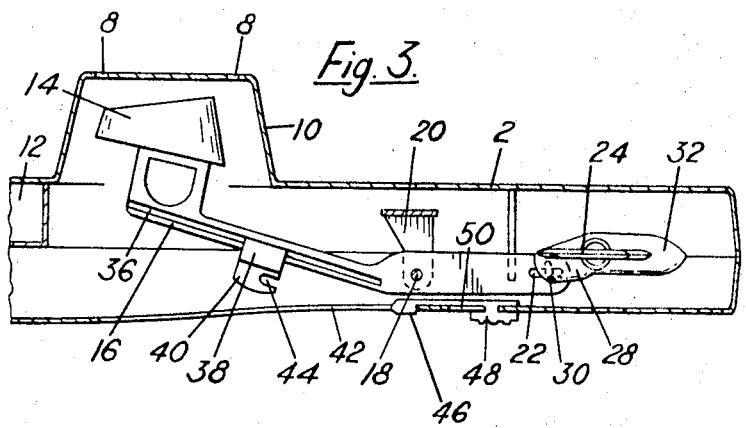
Inventor
Duncan Tong
By
Attorneys Nov. 16, 1971　　　DUNCAN TONG　　　3,619,938
SUBMERGED MODELS
Filed Dec. 4, 1970　　　　　　　　　　　　6 Sheets-Sheet 3
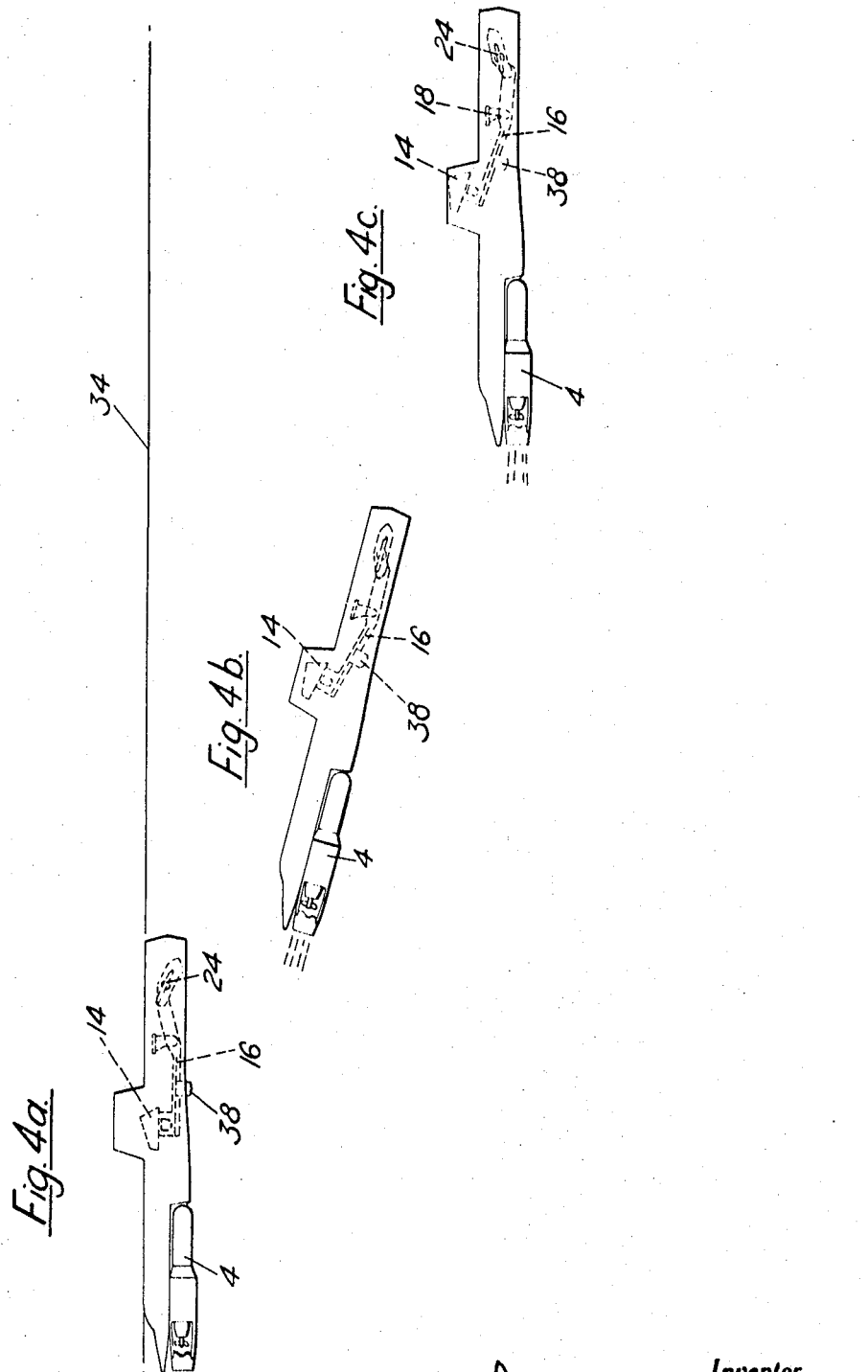

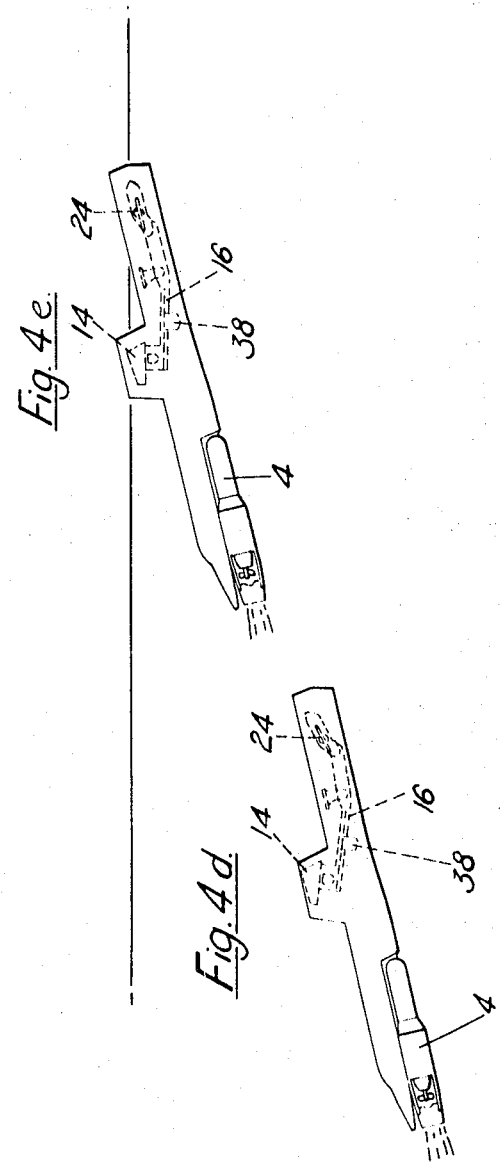

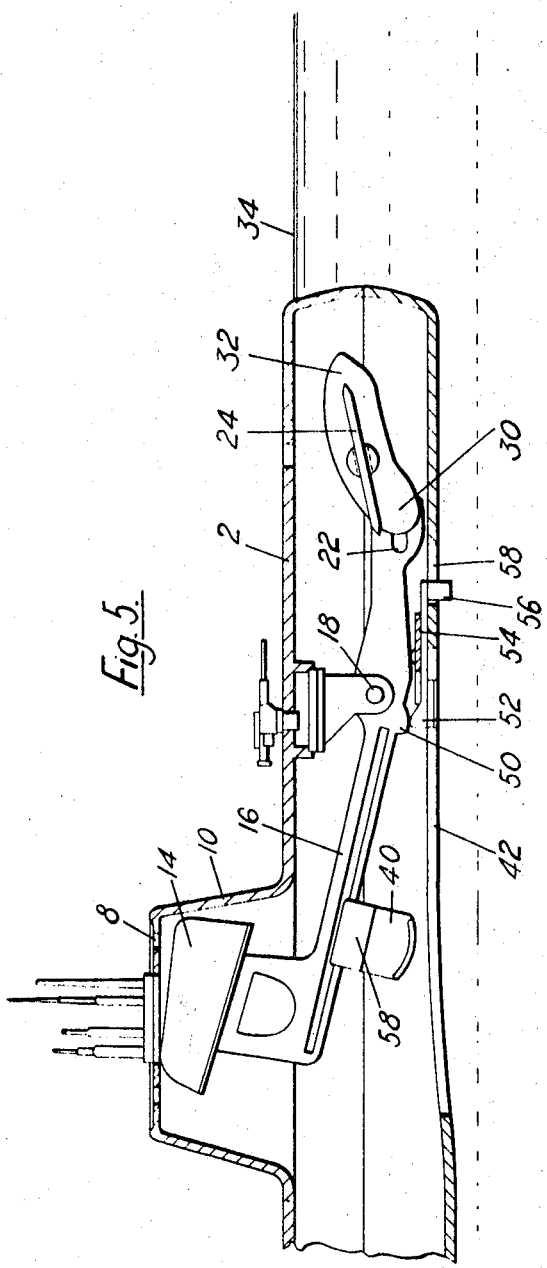

Nov. 16, 1971  DUNCAN TONG  3,619,938
SUBMERGED MODELS
Filed Dec. 4, 1970  6 Sheets-Sheet 6
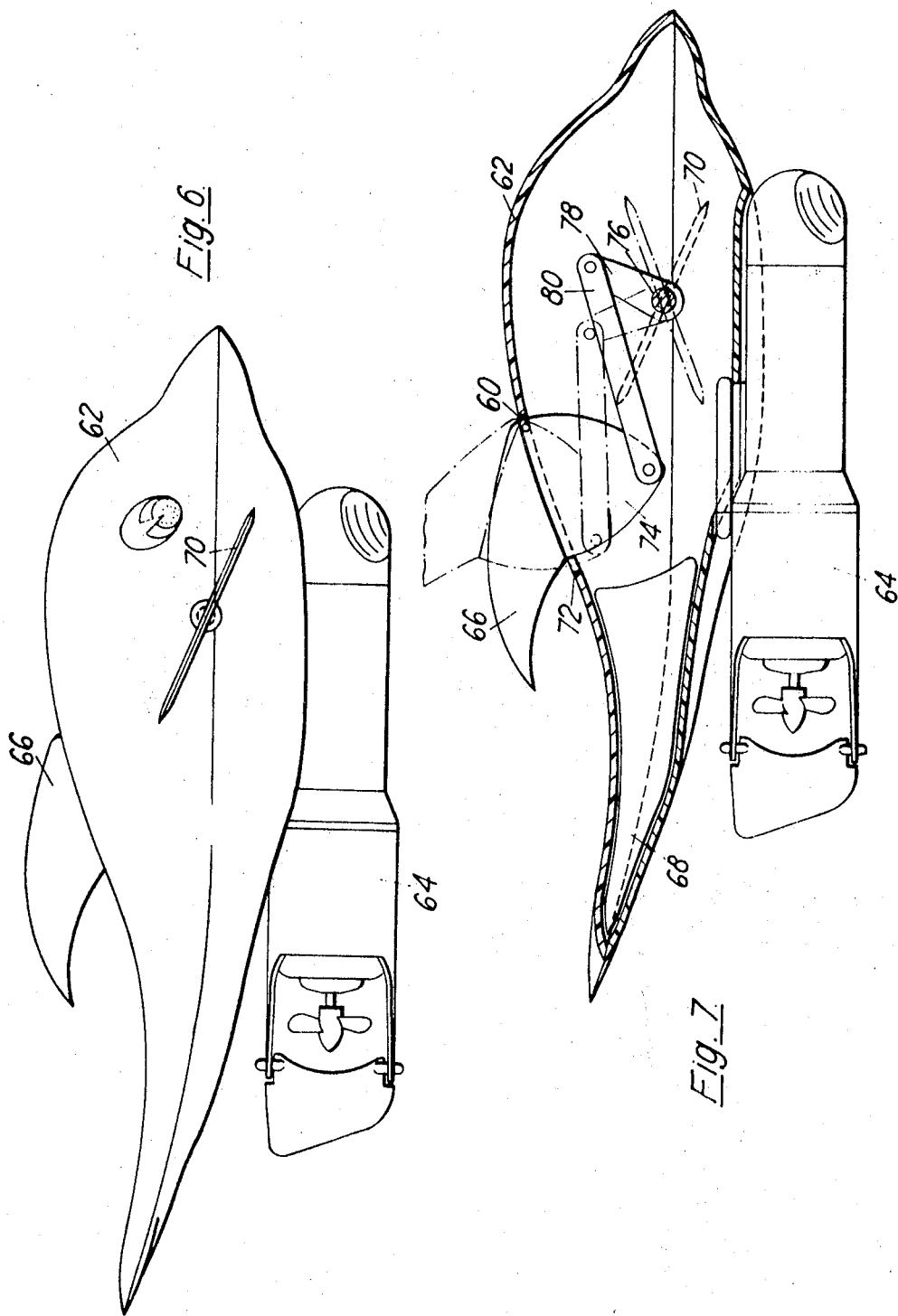

United States Patent Office 3,619,938
Patented Nov. 16, 1971

3,619,938
SUBMERGED MODELS
Duncan Tong, Hong Kong, assignor to
General Electric Company
Continuation-in-part of application Ser. No. 777,435,
Nov. 20, 1968. This application Dec. 4, 1970, Ser.
No. 95,141
Int. Cl. A63h 23/04
U.S. Cl. 46—94                                                   8 Claims

ABSTRACT OF THE DISCLOSURE

A power driven submarine model toy for sailing wholly or partly submerged in water having a control device comprising a float pivotally connected to the body of the model to an elevator fin, the angular position of which determines the angle of inclination of the model to the water through which it is being driven.

---

This application is a continuation-in-part of my patent application Ser. No. 777,435, now abandoned filed Nov. 20, 1968.

This invention relates to models intended to said beneath the surface of water.

It is desirable that such models e.g. toy submarines, fish etc. be driven through the water in a partly or wholly submerged condition, the depth of submersion being maintained during travel as in the case with the objects being copied. It is highly desirable to be able to make such models dive and re-surface continuously.

Such a model in accordance with the invention is provided with a control device comprising a float pivotally connected to the body of the model, and to an elevator fin, the angular position of which determines the angle of inclination of the model to the water through which the model is being driven.

The float may be mounted within the body of the model in the case of a submarine for example in such a way that relative movement is allowed in a vertical direction between the body of the model and the float, relative movement acting to adjust the elevator fin to maintain the model at a neutral position with respect to the surface of the water, with the model submerged or partly submerged beneath the surface of the water.

The depth at which the float is at rest in the water may be adjusted for example by sliding a weight along the lever to which the float is attached, to allow the model to sail at a variable preset lever.

The movement of the adjustment means may be sufficient to, in an extreme position, to make the control system become unstable thus causing the model to dive and re-surface continuously.

Further the adjustment means may be set in a position in which the tendency of the float to operate the elevator fins to return the submerged submarine to the surface counteracted. The submarine then dives and sails beneath the surface of the water at a depth depending on the power of the motor.

In an alternative arrangement the float is pivotally mounted for movement which is external to the body of the model and is connected by linkages (preferably internally) to the elevator. Upward movement of the float relative to the body so adjusts the position of the elevator that in use the angle of inclination of the model relative to the water is altered in an upward direction. Downward movement of the float relative to the model so adjusts the position of the elevator as in use to alter the angle of inclination of the model relative to the water in a downward direction.

The float is preferably fixed connected to an arm which is pivotally connected to an operating arm of the elevator by a linkage.

In the preferred embodiment of the arrangement the model is in the form of a toy animal such as a fish, a dolphin or a porpoise or the like and the float is so shaped and arranged as to resemble the animal's dorsal fin.

The invention will now be described by way of example with reference to the accompanying drawings in which:

FIG. 1b is a part cross-section of the model submarine with the control device in the position for diving;

FIG. 1c is a part cross-section of the model submarine with the control device in the position for surfacing;

FIG. 3 is a part cross-section of an alternative embodiment of a model submarine showing an adjustable control device in the neutral position;

FIG. 4a–e are sketch drawings of one sequence of diving and re-surfacing;

FIG. 5 is a view similar to FIG. 3 showing an alternative means for holding the float in the upper position;

FIG. 6 is a side elevation of a model dolphin in accordance with the invention; and FIG. 7 is a cross-sectional elevation of the dolphin shown in FIG. 6.

Figure 1A:
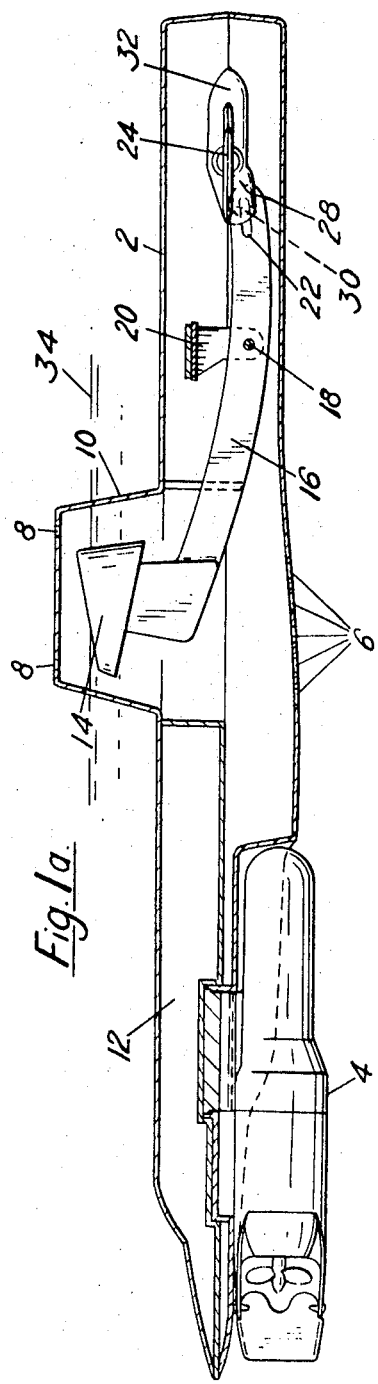
FIG. 1a is a cross-section of a model submarine in accordance with the invention with its control device in the neutral position.

Referring to FIGS. 1a, b, c and 2, the body of the submarine which is generally indicated at 2 is propelled in a forward direction by a battery driven motor and propeller unit 4.

The hollow body 2 can be flooded with water through holes 6 in the base, and air being then allowed to escape through holes 8 in the top of the coming tower 10.

A sealed buoyancy chamber 12 is provided within the body above the meter to help support the weight of the motor and propeller unit 4.

The vertical movement of the submarine is controlled by a device comprising a float 14 movable within the conning tower and attached to one end of an arm 16 which is pivotally mounted between its ends on a pin 18 mounted in a bracket 20 fixed to the body. The pivot allows the float to move in a vertical direction within the conning tower with respect to the body of the submarine. The other end of the arm 16 has a slot 22 to receive a pin 30 acting to connect the arm to a pair of elevator fins 24 which are mounted outside the body 2 one at each side thereof on a shaft 26 which is rotatably mounted in holes in the body 2. The shaft 26 has an integral outwardly extending arm 28 one end of which is connected to the arm 16 by the pin 30 which engages in slot 22. The other end of arm 28 constitutes a counterweight 32.

Any change in the position of the submarine from the neutral position shown in FIG. 1a where the submarine is located beneath the surface 34 of the water, causes the float 14 mounted on arm 16, to pivot about pin 18 which causes the elevator fins to rotate in a direction to restore the submarine to the neutral position.

Referring to FIG. 1b the submarine is in a position above the neutral position for instance on the surface of the water and the control surfaces or elevator fins 24 are tilted so that if the submarine is in forward motion it is caused to dive and is thereafter restored to the neutral position shown in FIG. 1a with the elevator fins horizontal, by an appropriate movement of the float relative to the body.

Referring to FIG. 1c the submarine is in a position below the neutral position, for instance completely immersed at some depth beneath the surface of the water. The float 14 is in its uppermost position relative to the body and elevator fins 24 are tilted so that if the submarine is in forward motion it is caused to rise towards the surface to restore it to the neutral position.

In the embodment shown in FIG. 3, the arm 16 is formed with a longitudinal groove 36 to receive a weight 38 slidably mounted on the groove. A tongue 40 projects from the weight so as to enable a user to move the weight by operation through a slot 42 in the bottom of the body of the submarine and a scale can be marked on the body adjacent the slot.

Sliding the weight 38 along the groove 36 varies the depth at which the float 14 is at rest in the water when in the neutral position. Thus, if the weight 38 is set close to the pin 18 the float will rest almost entirely on the surface of the water and the submarine will sail with its body only just below the surface of the water and with the conning tower almost entirely out of the water. By moving the weight 38 further from the pin 18 the float will be at its rest position when partially beneath the surface of the water and consequently the submarine may be made to sail further beneath the surface of the water.

The submarine may be made to hunt about in neutral position in the following manner;

As the weight 38 is moved further from pin 18 the upward movement exerted on arm 16 when the position of the submarine is changed becomes less and less. When correctly adjusted so that the float only just floats this movement becomes so small that if the submarine is sailing on the surface with the elevator fins 24 being sharply inclined so as to cause the submarine to dive steeply the small force applied to the float when submerged takes some time to operate the control surfaces and the surbmarine passes through the neutral level and is completely submerged. When the float has effected the change in the position of the control or elevator fin 26 the submarine surfaces rapidly, reassuming its starting position and the cycle repeats itself.

The sequence of diving and re-surfacing is illustrated in FIGS. 4a to 4c respectively, which shows the attitude of the submarine, the float and the elevator fins at various points in the sequence.

If the weight 38 is moved to its extreme position away from the pin 18, the tendency for the float to operate the elevator fins to return the submarine to the surface is counteracted, and the submarine dives and remains sailing beneath the surface of the water. The depth at which the submarine sails in this case depends on the power of the motor unit 4.

In order to make the submarine sail on the surface when desired the tongue 40 may be provided with a slot 44 to engage a lug 46 slidably mounted in the slot 42 and operated by a finger grip 48 so that if the weight 38 is slid to its extreme position near the pin 18 the lug 46 can be pushed forward by the finger grip 48 to engage in the slot 44 of the tongue 40 so locking the tongue and thus the elevator fins 24 in a fixed position, the elevator fins being inclined to keep the submarine on the surface of the water. Alternatively, the construction shown in FIG. 5 may be employed. In this embodiment the arm 16 is provided with a cam shaped shoulder 50 which can be engaged by the nose 52 of a slide 54 operated by an arm 56 extending through a slot 58 in the bottom of the body. When the nose 52 engages the shoulder 50 as seen in FIG. 5 the float is held in its uppermost position to ensure that the submarine cruises on the surface irrespective of the position of the weight 38. When the slide is moved to the right the arm 16 is freed and the submarine can then dive under the control of the float and weight.

As the power of the battery driving the motor exerts a considerable effect on the operation of the submarine it may be necessary to reset the position of the weight 38 as the battery life expires. When the battery is new the weight should be located away from the pivot 18 to ensure that the submarine dives and resurfaces automatically but as the battery weakens the submarine will not dive unless the weight is re-positioned nearer the pivot.

As may be seen from FIGS. 5 and 6 the model has a body 62 which is so shaped as to resemble the body of a dolphin. Beneath the body is mounted a self-contained electric power unit 64. The body is also provided with a float 66 which is so shaped and arranged as to resemble the dorsal fin of the dolphin and also has two fins 70 one on each side of the body which are also shaped to resemble fins of the dolphin. In order to help support the weight of the motor unit 64 a buoyancy tank 68 is included within the tail of the body.

Figure 2:
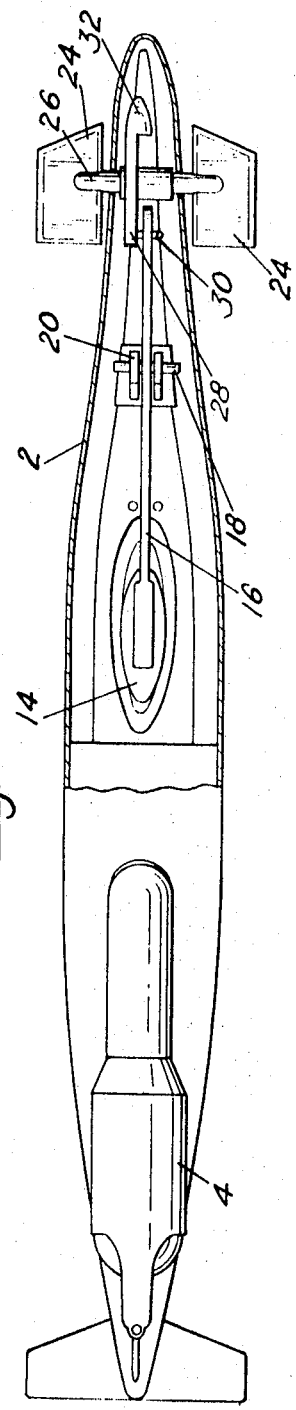
FIG. 2 is a plan view from beneath the submarine with part cut away to expose the control device.

The float 66 is pivotally mounted on a pin 70 in a slot 72 in the wall of the hollow body 62. The float is thus able to move in a vertical direction relative to the body. The float 66 is fixedly secured to a web or arm 74. The fins 70 are fixedly mounted on a common shaft 76 which extends through the body and to which it is pivotally mounted. An operating arm 78 is fixedly connected to the shaft 76 and is pivotally connected to the web or arm 74 by means of a link 80 so that downward movement of the float 66 relative to the body 62 causes clockwise rotation (as seen in the drawings) the shaft 76 and hence downward movement of the fins 70. The extreme downwards position of the float and linkage is shown in continuous outline in FIG. 2, the fin 70 being shown in broken outline. Further, upward movement of the float 66 relative to the body 2 causes anti-clockwise rotation of shaft 76 and hence upward movement of the fin 70 as seen in FIG. 2. The float, linkage and elevator are shown in ghost outline in FIG. 2 in the extreme upward position.

In use, when the model is placed in water with the power unit 64 running, initially the model floats on the surface with its float 66 and fins 70 in the attitude shown in FIG. 1. The power unit drives the model along and pressure is therefore developed on the upper surface of the fins 70 which tends to force the model under the surface of the water. When the model is completely immersed the float tends to rise relative to the body 62 so adjusting the fins 70 to position which causes the model to return to the surface whereupon the cycle repeats itself.

The control device may be made adjustable so that instead of the device being unstable and hunting as described above it may be so set that the model will sail at a predetermined level beneath the surface of the water.

I claim:

1. A power driven model for sailing in water and capable of sailing beneath the surface of the water, the model having a hollow body and a control device therein for determining the position of the model in the water, the control device comprising:
    (a) a first arm pivotally mounted between its ends, on a horizontal axis within the body;
    (b) a float mounted at one end of said arm;
    (c) a shaft pivotally mounted on the body and extending through the body between the interior and exterior thereof;
    (d) a control fin fixedly mounted on the said shaft and exterior of the body;
    (e) a second arm fixedly mounted on said shaft inside the body and pivotally connected to the other end of said first arm so that if the body of the model moves upwardly relative to the float the control fin is adjusted to alter the angle of inclination of the model to the water in a downward direction, and if the body of the model moves downwardly relative to the float the control fin is adjusted to alter the angle of inclination to the water of the model in an upward direction.

2. A model as claimed in claim 1, wherein the control device is set so that the model dives and re-surfaces continuously when sailing in the water.

3. A model as claimed in claim 1, including means for adjusting the control device so as to regulate the depth to which the model dives.

4. A model as claimed in claim 3 wherein the adjustment means comprises a weight mounted on the first arm movable towards or away from the pivot.

5. A model as claimed in claim 3 in which the control device has a locking means by which it may be locked in such a position that the model sails continuously on the surface of the water.

6. A model as claimed in claim 5 in which the locking means comprises a cam surface on the first arm, and a member slidably mounted on the body of the model so that in one position it bears on the cam surface to lock the control device with the float in an upper position, while in another position it is clear of the cam surface.

7. A power driven model as claimed in claim 1 wherein the float is pivotally mounted for movement which is external to the body of the model.

8. A power driven model as claimed in claim 7 wherein the model is so shaped and arranged as to resemble an animal having a dorsal fin which the float is arranged to resemble.

References Cited

UNITED STATES PATENTS

| | | | |
|---|---|---|---|
| 1,271,272 | 7/1918 | Bunkley | 46—94 X |
| 2,854,787 | 10/1958 | Oberg | 46—94 X |
| 2,914,887 | 12/1959 | Fleischmann | 46—94 X |
| 3,450,908 | 6/1969 | Mabuchi | 46—91 X |

ROBERT PESHOCK, Primary Examiner

R. F. CUTTING, Assistant Examiner

UNITED STATES PATENT OFFICE
CERTIFICATE OF CORRECTION

Patent No. 3,619,938              Dated    November 16, 1971

Inventor(s)  Duncan Tong

It is certified that error appears in the above-identified patent and that said Letters Patent are hereby corrected as shown below:

In the heading to the printed specification, lines 3 and 4, cancel "assignor to General Electric Company".

Signed and sealed this 6th day of June 1972.

(SEAL)
Attest:

EDWARD M. FLETCHER, JR.            ROBERT GOTTSCHALK
Attesting Officer                   Commissioner of Patents